US010989635B2

(12) United States Patent
Kersey

(10) Patent No.: US 10,989,635 B2
(45) Date of Patent: Apr. 27, 2021

(54) ACOUSTIC STANDING WAVE PARTICLE SIZE OR DISTRIBUTION DETECTION

(75) Inventor: Alan D. Kersey, South Glastonbury, CT (US)

(73) Assignee: CiDRA Corporate Services, Inc., Wallingford, CT (US)

( * ) Notice: Subject to any disclaimer, the term of this patent is extended or adjusted under 35 U.S.C. 154(b) by 1579 days.

(21) Appl. No.: 14/005,581

(22) PCT Filed: Mar. 19, 2012

(86) PCT No.: PCT/US2012/029672
§ 371 (c)(1), (2), (4) Date: Oct. 10, 2014

(87) PCT Pub. No.: WO2012/129170
PCT Pub. Date: Sep. 27, 2012

(65) Prior Publication Data

US 2014/0318225 A1 Oct. 30, 2014

Related U.S. Application Data

(60) Provisional application No. 61/454,084, filed on Mar. 18, 2011.

(51) Int. Cl.
*G01N 1/40* (2006.01)
*G01N 15/02* (2006.01)
(Continued)

(52) U.S. Cl.
CPC ....... *G01N 1/4077* (2013.01); *G01N 15/0255* (2013.01); *G01N 2001/4094* (2013.01);
(Continued)

(58) Field of Classification Search
CPC .... B01D 17/06; G01H 17/00; G01N 15/1459; G01N 2001/4094; G01N 2015/142;
(Continued)

(56) References Cited

U.S. PATENT DOCUMENTS 4,055,491 A 10/1977 Porath-Furedi
4,983,189 A * 1/1991 Peterson ................ A61M 1/36 210/188
(Continued)

OTHER PUBLICATIONS

Definition of "standing wave", Merriam-Webster dictionary, downloaded Jan. 9, 2019 (Year: 2019).*
(Continued)

*Primary Examiner* — Lisa M Caputo
*Assistant Examiner* — Rose M Miller
(74) *Attorney, Agent, or Firm* — Ware, Fressola, Maguire & Barber LLP

(57) ABSTRACT

Apparatus features an acoustic comb filter module configured to receive signaling containing information about different frequencies F1 and F2 to create a selected comb spacing D to capture certain particles having a selected size X in a flow stream in a flow pipe, and to provide an acoustic standing wave via ultrasonic excitation based at least partly on the two different frequencies F1 and F2 to create the selected comb spacing D to capture the certain particles having the selected size X in the flow stream in the flow pipe. The apparatus may also include a particle size or distribution determination module configured to receive the certain particles for off-stream analysis via a detection port that forms part of the flow pipe and determine the particle size or distribution of the certain particles in the flow stream in the flow pipe.

29 Claims, 7 Drawing Sheets

Apparatus or Arrangement No. 1: Swept Acoustic Comb Filter

(51) Int. Cl.
*G01N 15/00* (2006.01)
*G01N 15/10* (2006.01)
*G01N 15/14* (2006.01)

(52) U.S. Cl.
CPC ................ *G01N 2015/0053* (2013.01); *G01N 2015/1081* (2013.01); *G01N 2015/1087* (2013.01); *G01N 2015/142* (2013.01)

(58) Field of Classification Search
CPC ... G01N 2015/1413; G01N 2015/1081; G01N 2015/1087; G01N 2015/1093; G01N 2001/4077; G01N 15/0255; G01N 2015/0053; G01N 2015/2015
USPC ......... 210/513, 523, 748.01, 748.02, 748.07; 73/61.71, 61.72, 570.5
See application file for complete search history.

(56) References Cited

U.S. PATENT DOCUMENTS

| | | | | | |
|---|---|---|---|---|---|
| 5,006,266 | A * | 4/1991 | Schram | B01D 21/283 | 209/1 |
| 5,085,783 | A * | 2/1992 | Feke | B01D 21/283 | 210/243 |
| 5,225,089 | A * | 7/1993 | Benes | B01D 21/283 | 210/188 |
| 5,527,460 | A * | 6/1996 | Trampler | B01D 21/283 | 209/155 |
| 5,688,405 | A * | 11/1997 | Dickinson | B01D 21/283 | 210/170.09 |
| 5,688,406 | A * | 11/1997 | Dickinson | B01D 21/283 | 210/170.09 |
| 5,902,489 | A * | 5/1999 | Yasuda | B01D 21/283 | 204/660 |
| 6,216,538 | B1 * | 4/2001 | Yasuda | B01D 21/283 | 210/748.05 |
| 7,331,233 | B2 | 2/2008 | Scott | | |
| 7,601,269 | B2 * | 10/2009 | Ahn | B01L 3/502753 | 210/348 |
| 7,850,803 | B2 * | 12/2010 | Shiraishi | H01L 21/563 | 156/73.1 |
| 8,528,406 | B2 * | 9/2013 | Goddard | G01N 15/1404 | 210/748.01 |
| 8,865,003 | B2 * | 10/2014 | Yang | B01D 21/283 | 210/153 |
| 2006/0021437 | A1 * | 2/2006 | Kaduchak | G01N 15/1459 | 73/570.5 |
| 2009/0029870 | A1 * | 1/2009 | Ward | G01N 15/1404 | 506/9 |
| 2011/0278218 | A1 * | 11/2011 | Dionne | B01D 17/04 | 210/523 |

OTHER PUBLICATIONS

Definition of "standing wave", Eric Weisstein's World of Physics, scienceworld.wolfram.com, downloaded Jan. 9, 2019 (Year: 2019).*

* cited by examiner

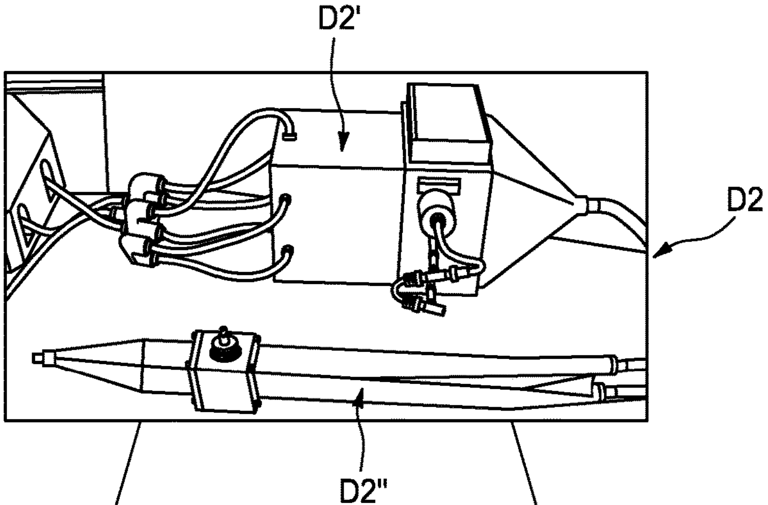
*FIG. 1b*
(PRIOR ART)
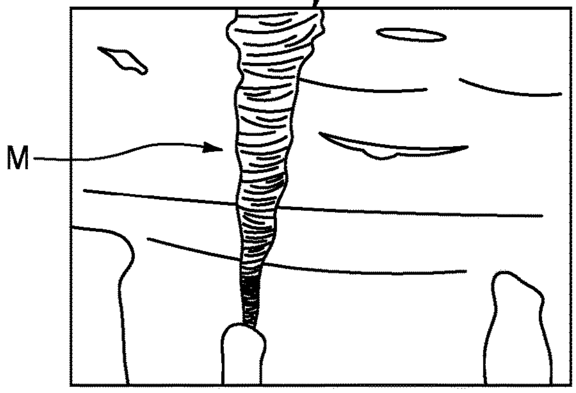
*FIG. 1b(1)*: Microalgae (10 μm)
(PRIOR ART)
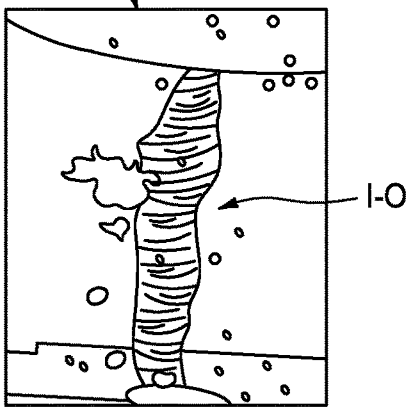
*FIG. 1b(2)*: Iron-Oxide (20 μm)
(PRIOR ART)

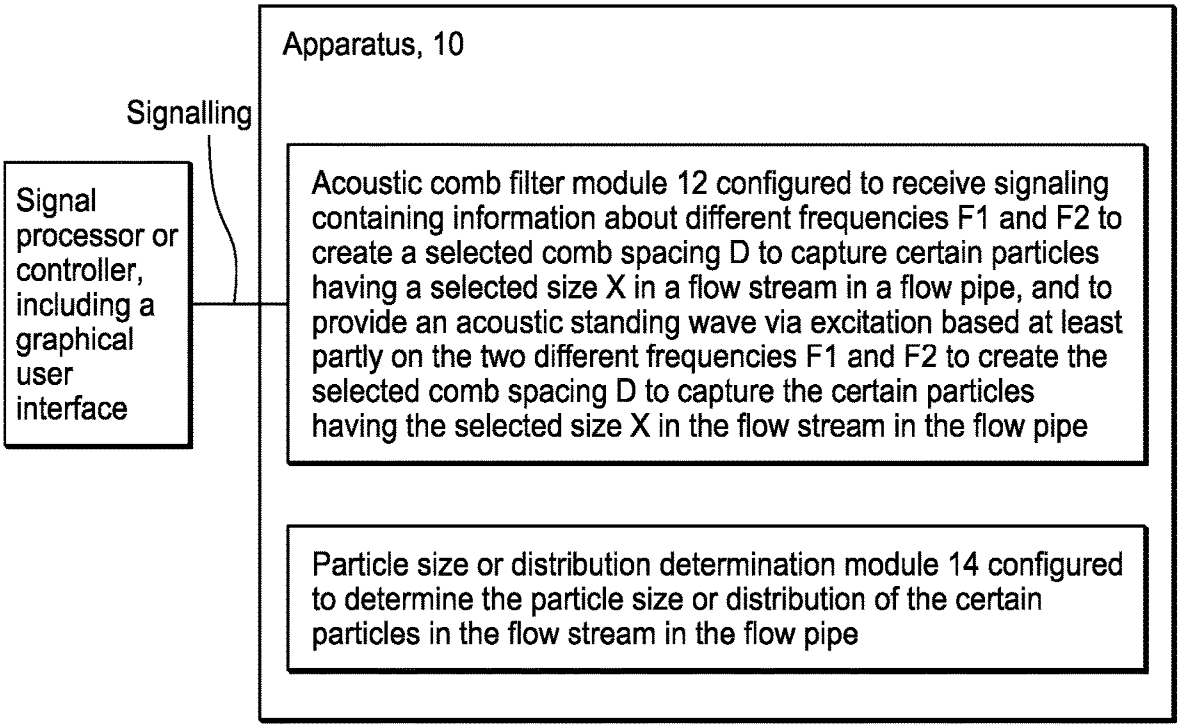

FIG. 2

Particle size or distribution determination module 14 configured either to assess the particle size distribution through sampling the flow stream at a series of difference average frequencies, F, including where at the highest frequencies, all particles are sampled and swept out of the flow pipe, whereas at lower frequencies, only the larger particles are effectively trapped by the acoustic comb and swept to a side detection port, or to analyze the mass of particles captured in a given time interval for a range of frequencies F and infer the particle distribution, or both.

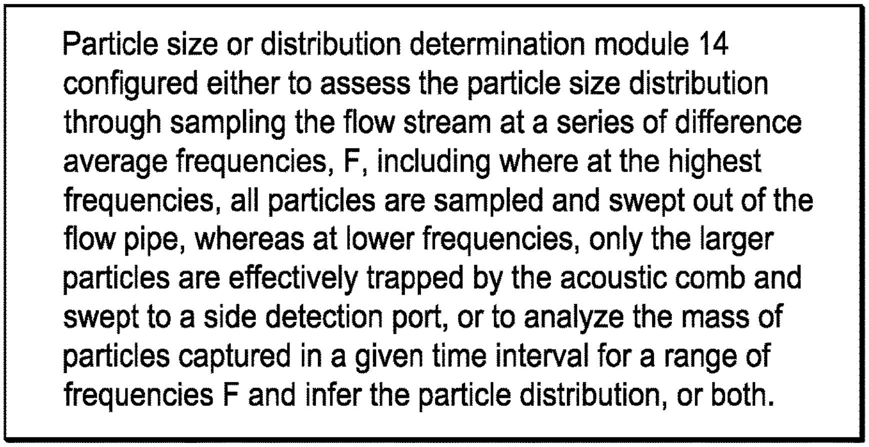

FIG. 2a

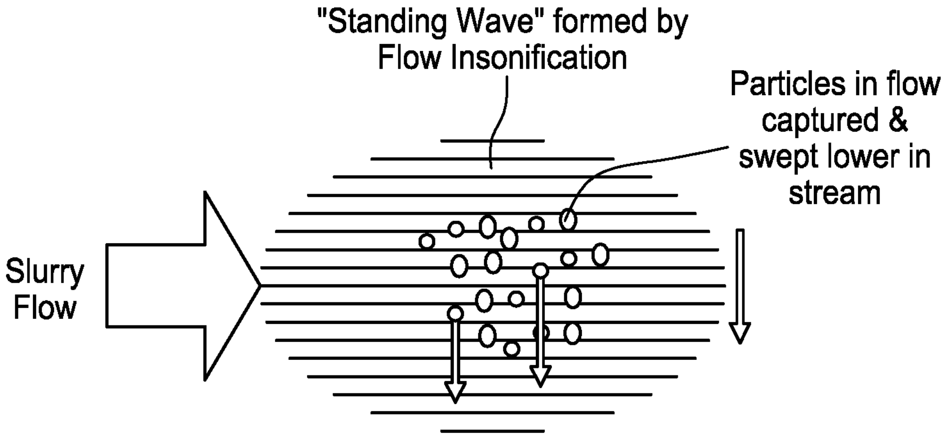
*FIG. 3a*: Swept Acoustic Comb Filter

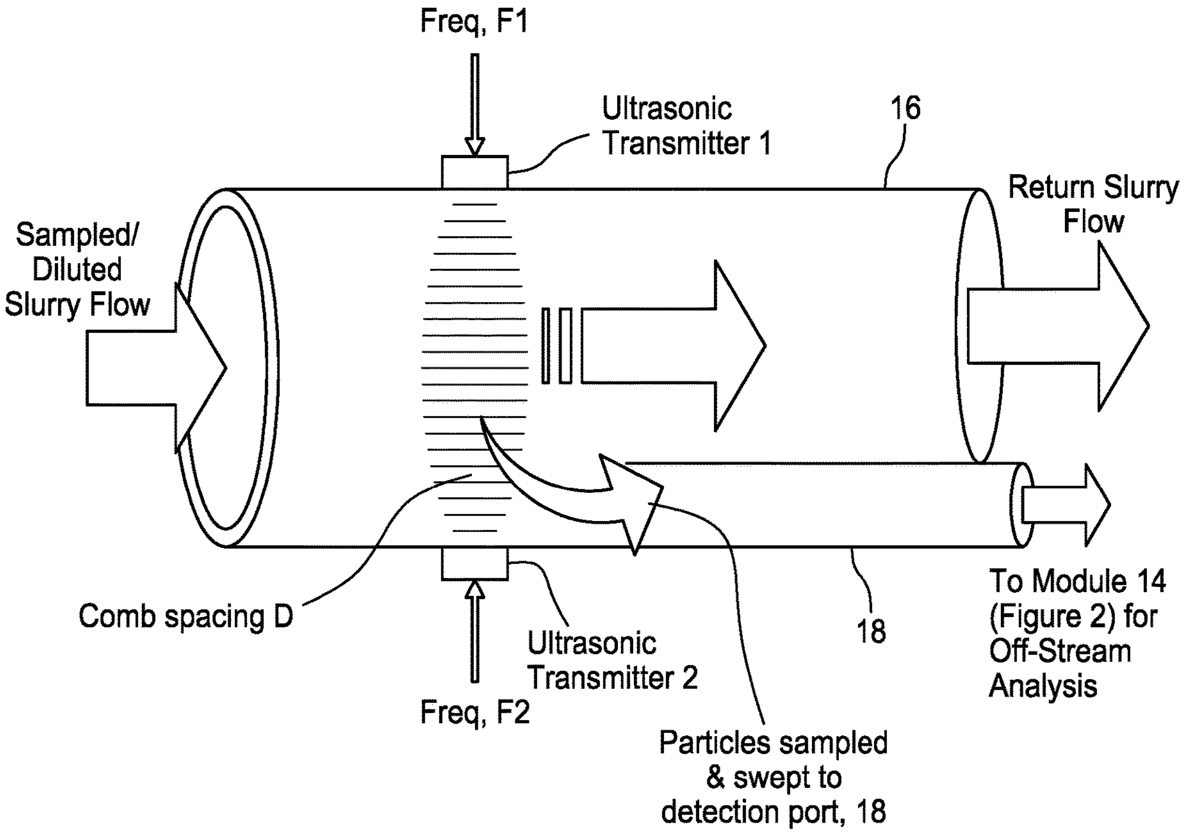
*FIG. 3b*: Apparatus or Arrangement No. 1: Swept Acoustic Comb Filter

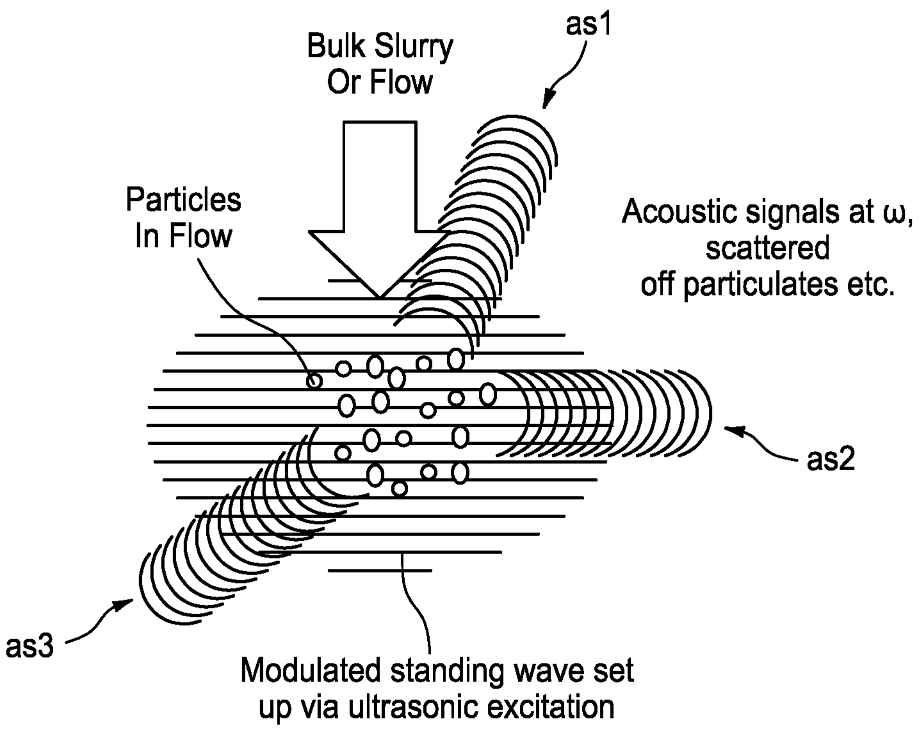
*FIG. 4a*: Sub-carrier Modulated Acoustic Comb Filter

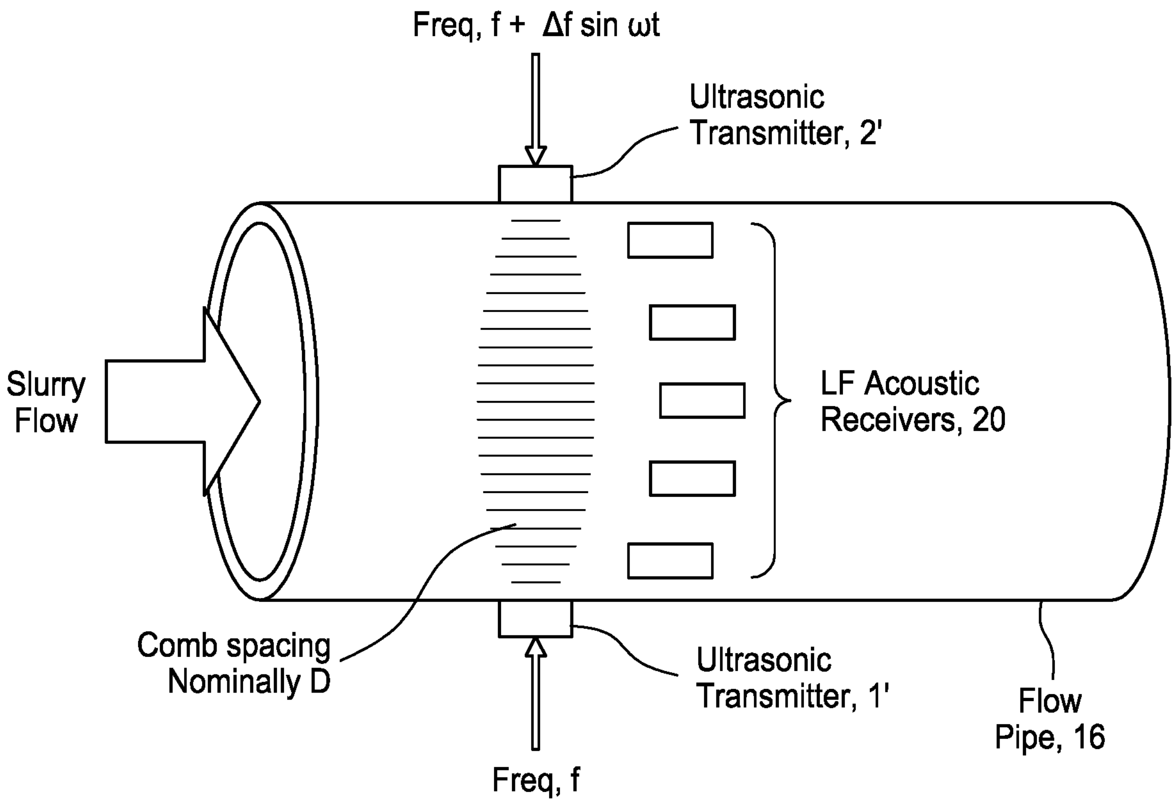
*FIG. 4b*: Apparatus Arrangement No. 2: Sub-carrier Modulated Acoustic Comb Filter

ACOUSTIC STANDING WAVE PARTICLE SIZE OR DISTRIBUTION DETECTION

CROSS-REFERENCE TO RELATED APPLICATIONS

This application corresponds to international patent application serial number PCT/US2012/029672, filed 19 Mar. 2012, which claims benefit to provisional patent application Ser. No. 61/454,084, filed 18 Mar. 2011, which is incorporated by reference in their entirety.

BACKGROUND OF THE INVENTION

1. Technical Field

This invention relates generally to a method and apparatus for particle size or distribution detection in a flow stream in a flow pipe using acoustic standing waves.

2. Description of Related Art

Prior art techniques are known that use a single frequency F to excite the standing wave. The standing wave results due to the counter propagating acoustic fields across the flow pipe: the first off the transducer directly, the other off the acoustic reflector. The periodicity, or comb spacing, D, of the nodes of the standing wave is a function of the frequency F, the speed of sound in the fluid (cf):

$$D=cf/2F$$

This produces an acoustic comb filter that can trap particles flowing in the fluid. The retention forces depend on the peak acoustic pressure, the particle size, and the periodicity D.

As particles are captured in this comb, drag forces will ultimately overcome the retention forces, and the particles will be released into the flow. If the flow is slow enough (as in prior art), the agglomeration of particles will result in them either lifting out of the flow (buoyant), or dropping in the flow due to gravity.

One problem with this approach is that if the flow is strong, the drag forces increase, and particles are only held/trapped momentarily until the drag forces exceed the retention forces. The particles are then swept forward with the flow and no overall filtering action is achieved.

In particular, acoustic agglomeration techniques are understood and used for filtering a flow stream, including techniques where a standing wave may be formed in the flow stream by ultrasonic excitation frequencies. FloDesign Sonics, Inc., a company in Wilbraham, Mass., has developed configurations using a standing wave for creating and trapping of particulate matter in a flow stream. One known application has been demonstrated in water purification with particulate of about 2% of the flow stream.

FIG. 1*a* sets forth known apparatus generally indicated as D1, showing flow channels, an acoustic transducer, a reflective surface, and a collection pocket, for the harvesting of microalgae through acoustophoretic trapping, as disclosed in U.S. patent publication no. 2011/0278218, which is hereby incorporated by reference. In FIG. 1*a*, the direction of the fluid flow is horizontal and the direction of the acoustic field is vertical. As shown, the flow pipe receives produced water that is processed using the acoustophoretic technology so as to provide from the flow pipe purified water. In operation, during the acoustophoretic processing micro-droplets are trapped at nodes of standing waves, such that collected micro-droplets agglomerate gain buoyancy and float to the surface to be removed. As shown, a piezo crystal is used to make acoustic waves.

Consistent with that disclosed FIG. 1*a*, the known acoustophoretic technology is characterized at least by the following features:

- It employs an acoustic radiation force,
- It is based on a fixed frequency or frequency sweep operation,
- It uses an acoustic standing wave that contains 100s of wavelengths,
- It is a resonance based operation,
- It provides the ability to trap and translate pollutants without any moving parts (i.e. a “Filterless” filter), and
- It uses buoyancy and gravitational settling for collection and separation.

Consistent with that disclosed in paragraph [0062] of the aforementioned U.S. patent publication no. 2011/0278218, FIG. 1*b* shows a photo of a device generally indicated as D2 capable of processing 3 gallons/min of emulsified oil-water, and includes an upper device D2' and a lower device D2". The emulsion flows in at the left side (bottom of the device D2', laying on its side); transducers are positioned on the side; and oil is removed from the right side (top of the device D2'). The device D2" shown in the bottom of the photo in FIG. 1*b* is designed for the emulsion to flow in at the left (bottom of the device, laying on its side); there are two separation regions where the oil travels in one and the pure water in the second. In the device D2" shown in the bottom of FIG. 1*b* the emulsion flows in on the left and separate oil and water channels are shown on the right of the device D2".

FIG. 1*b*(1) shows microalgae (10 microns) generally indicated as M being processed by the device D2 shown in FIG. 1*b*, and FIG. 1*b*(2) shows iron-oxide (20 microns) generally indicated as I-O being processed by the device D2 shown in FIG. 1*b*.

The known acoustophoretic technology may be characterized by a trapping efficiency for high-particulate slurry flow that is low. In view of this, there is a need in the industry to provide a better way for trapping high-particulate slurry flow, e.g., by levering the known acoustophoretic technology using alternative configurations according to the present invention. Moreover, there is a need in the industry to provide a better way for detecting particle size or distribution in a flow stream in a flow pipe, e.g., using acoustic standing waves.

SUMMARY OF THE INVENTION

The present invention provides particle size or distribution detection techniques using acoustic standing wave technology.

In its broadest sense, the present invention provides new and unique apparatus featuring an acoustic comb filter module configured to receive signalling containing information about different frequencies F1 and F2 to create a selected comb spacing D to capture certain particles having a selected size X in a flow stream in a flow pipe, and provide an acoustic standing wave via excitation based at least partly on the two different frequencies F1 and F2 to create the selected comb spacing D to capture the certain particles having the selected size X in the flow stream in the flow pipe. The signalling may be received, e.g., from a processor or controller, including signalling in response to a graphical user interface being provided by a user controlling the apparatus.

According to some embodiments, and by way of example, the present invention may take the form of apparatus featuring the acoustic comb filter module in combination with a particle size or distribution determination module that may be configured to determine the particle size or distribution of the certain particles in the flow stream in the flow pipe, e.g., used for, or forming part of, off-stream analysis.

The particle size or distribution determination module may be configured to receive the certain particles for off-stream analysis via a detection port that forms part of the flow pipe.

According to some embodiments, the apparatus may also include the flow pipe configured to provide the flow stream having particles with different sizes, including the combination of the flow pipe including the detection port configured to provide the certain particles having the selected size X in the flow stream from the flow pipe for the off-stream analysis.

The flow stream may include, or takes the form of, a slurry flow, including a sampled/diluted slurry flow.

The acoustic comb filter module may be programmable to provide different acoustic standing waves at different frequencies to create different selected comb spacings to capture different certain particles having different selected sizes in the flow stream in the flow pipe.

Swept Acoustic Comb Filter

According to some embodiments of the present invention, the acoustic comb filter module may include, or take the form of, a swept acoustic comb filter configured to provide a swept acoustic standing wave set up via ultrasonic excitation based at least partly on the two different frequencies F1 and F2.

The swept acoustic comb filter may be configured to provide the sweep of the acoustic standing wave based at least partly on the transit time across the flow stream being less than the capture time of the certain particles.

The swept acoustic comb filter may be configured with a first ultrasonic transmitter to provide a first acoustic signal at a first frequency F1 and with a second ultrasonic transmitter to provide a second acoustic signal at a second frequency F2.

The swept acoustic comb filter may be configured to be swept, e.g., at frequency F1−F2 "fringes" per second.

The swept acoustic comb filter may be configured to capture and sweep the certain particles lower in the flow stream.

In effect, a standing wave can be achieved by directly passing two counter propagating acoustic waves across the flow pipe, using opposing acoustic transducers. (with no acoustic reflector). If the frequencies of excitation of these two transducers is identical, e.g. F, then a standing wave is formed as in the prior art technique set forth above.

However, if the excitation is based on the two different frequencies F1 and F2, then the 'standing wave' becomes a "Quasi-Standing Wave", as it is swept across the flow tube at a rate of F1−F2, according to some embodiments of the present invention.

The comb spacing, D, is still related to the frequency F, but now F is the average of F1+F2 (e.g. F=(F1+F2)/2).

As there may be hundreds of 'nodes' in the acoustic comb across the flow pipe, the rate at which the acoustic "comb" sweeps can be adjusted via the frequency difference F1−F2. For a 100 Hz frequency difference, the comb will translate across the flow stream at a 100 nodes per second (up, or down depending on whether the frequency difference is positive or negative).

Particles captured in the flow stream are now translated across the pipe cross-section and moved to the edge of the pipe. If this is accomplished before the drag forces overcome the retention forces (the 'capture time'), the captured particles can be swept to the side of the flow pipe, and released into a side-stream port/pipe.

This new swept acoustic standing wave technique has a number of potential applications:

1) If the comb periodicity is set such that all particles above size X are captured by the swept acoustic comb to the side port/pipe, then particulate matter in the flow can be filtered out effectively and disposed.

2) As in application no. 1, but the particles are extracted on a periodic 'sampling' basis and the particles extracted are sent for further particle-size analysis, such as sieving, laser diffraction, etc.

3) By adjusting the comb periodicity, the particles sizes selected and drawn from the tube can be altered, and thus the particle size distribution can be assessed through sampling the flow at a series of difference average frequencies, F. In this case, at the highest frequencies, all particles are sampled and swept out of the flow, whereas at lower frequencies, only the larger particles are effectively trapped by the acoustic comb and swept to the side port. By analyzing the mass of particles captured in a given time interval for a range of frequencies F, the particle distribution can be inferred.

Sub-Carrier Modulated Acoustic Comb Filter

Alternatively, according to some embodiments of the present invention, the acoustic comb filter module may include, or take the form of, a sub-carrier modulated acoustic comb filter configured to provide a modulated standing wave set up via ultrasonic excitation based at least partly on the two frequencies F1 and F2 with a comb spacing nominally D and with acoustic signals at ω, oscillated at ω/2π, and scattered off particulates in the flow stream.

The sub-carrier modulated acoustic comb filter may be configured with a first ultrasonic transmitter to provide a first acoustic signal at a first frequency F1 and with a second ultrasonic transmitter to provide a second acoustic signal at a second frequency F2, e.g., where F2=F1+ΔF1 sin (ωt) and is swept at ω/2π.

The apparatus may also include low frequency (LF) acoustic receivers configured in the flow pipe configured to receive the acoustic signals.

In effect, using the 'opposing acoustic transponder' configuration of the swept acoustic standing wave technique set forth above, if the excitation is based on two different frequencies F1 and F2, where F2=F1+ΔF sin(wt), then the 'standing wave' becomes again a "Quasi-Standing Wave", as it is swept back and forth in an oscillatory manner across the flow (i.e., not in one direction as in the swept case).

The comb spacing, D, is still related to the frequency F, but now F is the average of F1+F2 (e.g. F=(F1+F2)/2).

The rate of oscillation is given by w/2π, and the amplitude of the oscillation depends on ΔF: e.g., if ΔF is 10 Hz, then the comb will oscillate back and forth about some nominal point by +/−10 nodes at a frequency of w/2π.

Particles in the flow stream small enough to be captured by the acoustic comb are now translated in an oscillatory fashion across the pipe cross-section. The motion of these trapped particles create acoustic pressure fields, and consequently, the modulated particles generate radiated acoustic signatures which can be detected by low frequency acoustic receivers around the pipe.

The detected signals will be at harmonics of the 'sub-carrier' frequency w/2π.

As the particle sizes captured is dependent on the nominal frequency F1 (as this determines the comb spacing), changing the comb spacing will alter the degree of particle capture and thus the amplitude of the acoustic signal emitted at the modulation frequency w/2p.

This sub-carrier modulation acoustic standing wave technique has the potential applications for particle size determination, as follows: If the comb periodicity is set such that no particles are captured by the modulated acoustic comb, then there will be no radiated LF acoustic signal.

If the comb periodicity is set such that all particles above size X1 are captured by the modulated acoustic comb, then there will be a radiated LF acoustic signal of amplitude A1.

If the comb periodicity is set such that all particles above size X2 are captured by the modulated acoustic comb, then there will be a radiated LF acoustic signal of amplitude A2.

This is repeated for a series of periodicities Xj and Aj, until substantiality all particles are captured.

The increase in amplitude A1, A2, A3, . . . , An maps out the cumulative particle size distribution in the flow.

The Method

According to some embodiments, the present invention may take the form of a method comprising steps for providing with an acoustic comb filter module an acoustic standing wave via excitation based at least partly on two different frequencies F1 and F2 to create a selected comb spacing D to capture certain particles having a selected size X in a flow stream in a flow pipe; and determining with a particle size or distribution determination module the particle size or distribution of the certain particles in the flow stream.

According to some embodiments of the present invention, the method may include one or more of the features set forth above and herein.

The Combination of the Flow Pipe and Acoustic Comb Filter Module

According to some embodiments, the present invention may take the form of apparatus featuring a flow pipe in combination with an acoustic comb filter module. The flow pipe may be configured to provide a flow stream having particles with different sizes. The acoustic comb filter module may be configured to provide an acoustic standing wave via excitation based at least partly on two different frequencies F1 and F2 to create a selected comb spacing D to capture certain particles having a selected size X in the flow stream in the flow pipe.

According to some embodiments of the present invention, the combination of the flow pipe and acoustic comb filter module may include one or more of the features set forth above and herein.

In effect, the present invention aims to leverage known acoustic standing wave technology in the area of particle size/distribution determination, e.g., of a flow stream in a flow pipe.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. **1*a*** is a diagram of acoustic standing wave technology used for filtering that is known in the art.

Figure 1A:
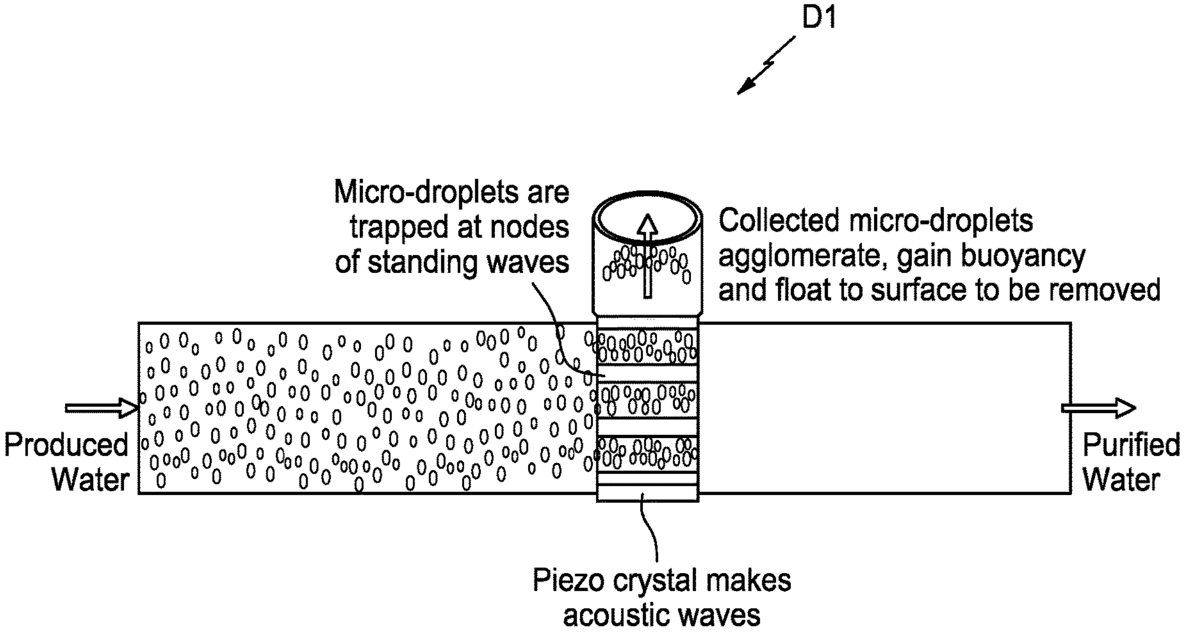

FIG. **1*b*** is a diagram of acoustic standing wave technology used for filtering that is known in the art.

FIG. **1*b*(1) is a photograph of microalgae (10 microns) subjected to the acoustic standing wave technology used for filtering in FIG. 1*b*** that is known in the art.

FIG. **1*b*(2) is a photograph of Iron-Oxide (20 microns) subjected to the acoustic standing wave technology used for filtering in FIG. 1*b*** that is known in the art.

FIG. 2A is a block diagram of apparatus according to some embodiments of the present invention.

FIG. 2B shows a particle size or distribution module configured either to assess the particle size distribution through sampling the flow stream at a series of difference average frequencies, F, including where at the highest frequencies, all particles are sampled and swept out of the flow pipe, whereas at lower frequencies, only the larger particles are effectively trapped by the acoustic comb and swept to a side detection port, or to analyze the mass of particles captured in a given time interval for a range of frequencies F and infer the particle distribution, or both.

FIG. **3*a*** is a diagram of a technique for capturing particles using a swept acoustic comb filter technique, according to some embodiments of the present invention.

FIG. **3*b*** is a diagram of apparatus or arrangement for implementing the technique for capturing particles using the swept acoustic comb filter technique, according to some embodiments of the present invention.

FIG. **4*a*** is a diagram of a technique for capturing particles using a sub-carrier modulated acoustic comb filter technique, according to some embodiments of the present invention.

FIG. **4*b*** is a diagram of apparatus or arrangement for implementing the technique for capturing particles using the sub-carrier modulated acoustic comb filter technique, according to some embodiments of the present invention.

DETAILED DESCRIPTION OF THE INVENTION

FIG. 2A

According to some embodiments, and by way of example, FIG. 2A shows the present invention in the form of apparatus 10 featuring an acoustic comb filter module 12. In FIG. 2A, the acoustic comb filter module 12 is shown in combination with a particle size or distribution determination module 14 for off-stream analysis, according to some embodiments of the present invention.

The acoustic comb filter module 12 may be configured to receive signalling containing information about different frequencies F1 and F2 to create a selected comb spacing D to capture certain particles having a selected size X in a flow stream in a flow pipe 16, and to provide an acoustic standing wave via excitation based at least partly on the two different frequencies F1 and F2 to create the selected comb spacing D to capture the certain particles having the selected size X in the flow stream in the flow pipe 16 (see FIGS. **3*b* and 4*b***).

The particle size or distribution determination module 14 may be configured to determine the particle size or distribution of the certain particles in the flow stream in the flow pipe, e.g., using or forming part of off-stream analysis.

FIGS. 3a and 3b: Swept Acoustic Comb Filter

Consistent with that described herein, the acoustic comb filter module 12 may include, or take the form of, a swept acoustic filter using a technique where a standing wave is formed by flow insonification in a slurry flow so that particles in a slurry flow stream are captured and swept lower (depicted by the three arrows) in the slurry flow stream as generally depicted in FIGS. 3_a_ and 3_b_. In this technique, e.g., the swept standing wave may be set up via ultrasonic excitation based at least partly on the two frequencies F1 and F2, and the comb spacing D may be set to capture the particle having size X. The sweep of the standing wave is based at least partly on the transit time across the slurry flow being less than the capture time of the certain particles.

FIG. 3_b_ shows an embodiment where the swept acoustic comb filter may be configured with, or take the form of, a first ultrasonic transmitter 1 to provide a first acoustic signal at a first frequency F1 and a second ultrasonic transmitter 2 to provide a second acoustic signal at a second frequency F2, so as to provide the swept acoustic standing wave having the comb spacing D set up via the ultrasonic excitation based at least partly on the two different frequencies F1 and F2. Transmitters like elements 1 and 2, including transmitters in the form of ultrasonic transmitters, are known in the art, and the scope of the invention is not intended to be limited to any particular type or kind thereof either now known or later developed in the future. Moreover, based on that disclosed in the instant patent application, a person skilled in the art without undue experimentation would be able to implement or configure the first ultrasonic transmitter 1 and the second ultrasonic transmitter 2 to provide the swept acoustic standing wave via excitation based at least partly on the two different frequencies F1 and F2 to create the selected comb spacing D to capture the certain particles having the selected size X in the flow stream in the flow pipe 16 (see FIG. 3_b_).

In FIG. 3_b_, the swept acoustic comb filter may be configured to be swept, e.g., at frequency F1–F2 "fringes" per second, although the scope of the invention is intended to include other sweeping frequencies. The swept acoustic comb filter may also be configured to provide the sweep of the acoustic standing wave based at least partly on the transit time across the flow stream being less than the capture time of the certain particles. In FIG. 3_b_, the slurry flow is shown by way of example in the form of a sampled/diluted slurry flow, although the scope of the invention is intended to include other types or kind of flow streams or slurry flows either now known or later developed in the future. In other words, the scope of the invention is not intended to be limited to the type or kind of flow stream being processed.

In FIG. 3_b_, the flow pipe 16 may be configured with a detection port 18. In operation, the particle size or distribution determination module 14 (FIG. 2) may be configured to receive the certain particles via the detection port 18 (FIG. 3_b_) that forms part of the flow pipe 16. The flow pipe 16 is also configured to provide return flow for subsequent processing in a manner that does not form part of the underlying invention.

FIGS. 4_a_ and 4_b_: Sub-carrier Modulated Acoustic Comb Filter According to some embodiments of the present invention, the acoustic comb filter module may include, or take the form of, a sub-carrier modulated acoustic comb filter using a technique where a modulated standing wave is set up via ultrasonic excitation based at least partly on the two frequencies F1 and F2 with a comb spacing nominally D, with acoustic signals at ω, oscillated at ω/2π, and scattered off particulates in the bulk slurry or flow stream, as generally depicted in FIGS. 4_a_ and 4_b_. In FIG. 4_a_, the acoustic signals are indicated as as1, as2, as3 directed towards the particles in flow in the bulk slurry or flow.

FIG. 4_b_ shows an embodiment where the sub-carrier modulated acoustic comb filter may be configured with, or take the form of, with a first ultrasonic transmitter 1' to provide a first acoustic signal at a first frequency F1 and with a second ultrasonic transmitter 2' to provide a second acoustic signal at a second frequency F2, e.g., where F2=F1+ΔF1 sin (ωt), and is swept at ω/2π. Consistent with that stated above, transmitters like elements 1' and 2', including transmitters in the form of ultrasonic transmitters, are known in the art, and the scope of the invention is not intended to be limited to any particular type or kind thereof either now known or later developed in the future. Moreover, based on that disclosed in the instant patent application, a person skilled in the art without undue experimentation would be able to implement or configure the first ultrasonic transmitter 1' and the second ultrasonic transmitter 2' to provide the modulated acoustic standing wave with the acoustic signals at ω, oscillated at ω/2π, and scattered off the particulates in the bulk slurry or flow stream to create the selected comb spacing nominally D to capture the certain particles having the selected size X in the flow stream in the flow pipe 16 (see FIG. 4_b_).

In FIG. 4_b_, the apparatus may also include low frequency (LF) acoustic receivers generally indicated as20 configured in the flow pipe 16 configured to receive the acoustic signals as1, as2, as3 (FIG. 4_a_).

The Module 12 or 14

By way of example, and consistent with that described herein, the functionality of the modules 12 or 14 in FIG. 2 may be implemented in whole or in part using hardware, software, firmware, or a combination thereof, although the scope of the invention is not intended to be limited to any particular embodiment thereof. The acoustic comb filter module 12 may be configured with a controller or processor for providing one or control or processor signals, e.g. to the ultrasonic transmitters in FIGS. 3_b_ and 4_b_. In a typical software implementation, the signal processor would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality set forth in the module 12 or 14, such as for controlling the operation of the ultrasonic transmitters in FIGS. 3_b_ and 4_b_, or for determining the size or distribution of the certain particles in the flow stream, as well as other functionality described herein without undue experimentation. The scope of the invention is not intended to be limited to any particular implementation using technology now known or later developed in the future. Moreover, the scope of the invention is intended to include the signal processor being a stand alone module, as shown, or in the combination with other circuitry for implementing another module.

Applications

The scope of the invention is described in relation to processing slurry. However, the scope of the invention is intended to include other types or kinds of applications either now known or later developed in the future, e.g., including a processing other types or kinds of process flows.

THE SCOPE OF THE INVENTION

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. Apparatus for filtering a flow stream flowing in a flow pipe in a flow direction, comprising:

opposing acoustic transducers arranged on the flow pipe that include a first ultrasonic transmitter configured to respond to control signaling and provide a first acoustic signal at a first frequency F1;

a second ultrasonic transmitter configured to respond to the control signaling and provide a second acoustic signal at a second frequency F2, the first frequency F1 and the second frequency F2 being two different frequencies F1 and F2; and an acoustic comb filter module having a controller configured to receive signaling containing information about the first frequency F1 and the second frequency F2, and provide the control signaling for controlling the operation of the first ultrasonic transmitter and the second ultrasonic transmitter to generate a swept acoustic standing wave that is transverse to the flow direction of the flow stream in the flow pipe and having a selected comb spacing D set up via excitation based at least partly on the two different frequencies F1 and F2 to capture and sweep lower certain particles having a selected size X in a flow stream flowing in a flow pipe, the sweep of the swept acoustic standing wave being based at least partly on a transit time across the flow stream being less than a capture time of the certain particles.

2. Apparatus according to claim 1, wherein the apparatus further comprises a particle size or distribution determination module configured to receive the certain particles captured and determine a particle size or distribution of the certain particles in the flow stream flowing in the flow pipe.

3. Apparatus according to claim 2, wherein the particle size or distribution determination module is configured to assess the particle size distribution through sampling the flow stream at a series of difference average frequencies, F, including where at the highest frequencies, all particles are sampled and swept out of the flow pipe, whereas at lower frequencies, only the larger particles are effectively trapped by an acoustic comb and swept to a side detection port.

4. Apparatus according to claim 2 wherein the particle size or distribution determination module is configured to analyze the mass of particles captured in a given time interval for the two different frequencies F1 and F2 and infer a particle size distribution.

5. Apparatus according to claim 4, wherein the selected comb spacing D is related to a frequency F, where the frequency F is an average of F1+F2 or where F=(F1+F2)/2.

6. Apparatus according to claim 4, wherein particle sizes captured are dependent on the first frequency F1 that is a nominal frequency, so that changing the selected comb spacing D will alter the degree of particle capture and thus the amplitude of acoustic signaling emitted at a modulation frequency w/2π, where w is a given frequency and π is pi.

7. Apparatus according to claim 1, wherein the first ultrasonic transmitter is arranged on the flow pipe; and the second ultrasonic transmitter is arranged on the flow pipe across from the first ultrasonic transmitter in order to generate the swept acoustic standing wave that is transverse to the flow direction of the flow stream in the flow pipe.

8. Apparatus according to claim 1, wherein the apparatus comprises the flow pipe that includes a detection port configured to provide the certain particles captured having the selected size X in the flow stream from the flow pipe for off-stream analysis.

9. Apparatus according to claim 8, wherein the first ultrasonic transmitter and the second ultrasonic transmitter are arranged on opposite sides of the flow pipe in order to generate the swept acoustic standing wave that is transverse to the flow direction of the flow stream in the flow pipe; and the detection port is arranged on one of the opposite sides in order to receive the certain particles captured having the selected size X in the flow stream from the flow pipe for the off-stream analysis.

10. Apparatus according to claim 9, wherein the detection port is arranged on the flow pipe downstream from the first ultrasonic transmitter and the second ultrasonic transmitter.

11. Apparatus according to claim 1, wherein the flow stream is a slurry flow.

12. Apparatus according to claim 1, wherein the acoustic comb filter module comprises a swept acoustic comb filter.

13. Apparatus according to claim 12, wherein the swept acoustic comb filter is configured to be swept at frequency of F1−F2.

14. Apparatus according to claim 1, wherein the first ultrasonic transmitter and the second ultrasonic transmitter are arranged on opposite sides of the flow pipe in order to generate the swept acoustic standing wave transverse to the flow direction of the flow stream in the flow pipe.

15. Apparatus according to claim 1, wherein the acoustic comb filter module is programmable to provide different swept acoustic standing waves at different frequencies to create different selected comb spacings to capture different certain particles having different selected sizes in the flow stream in the flow pipe.

16. Apparatus according to claim 1, wherein the acoustic comb filter module is configured to receive the signaling in response to a graphical user interface being provided by a user controlling the apparatus.

17. Apparatus according to claim 1, wherein the swept acoustic standing wave is an acoustic comb swept across the flow pipe at a rate of F1−F2.

18. Apparatus according to claim 17, wherein the acoustic comb is swept across the flow stream flowing in the flow pipe at an adjustable rate that depends on a frequency difference F1−F2.

19. Apparatus according to claim 17, wherein the acoustic comb filter module is configured to set a comb periodicity so all particles above the selected size X are captured by the acoustic comb and swept to a side port/pipe of the flow pipe, so as to filter out particulate matter in the flow stream.

20. Apparatus according to claim 17, wherein the acoustic comb filter module is configured to extract the certain particles on a periodic basis to be sent for further particle-size analysis.

21. Apparatus according to claim 17, wherein the acoustic comb filter module is configured to adjust a comb periodicity, so particles sizes selected and drawn from the flow pipe can be altered.

22. Apparatus according to claim 1, wherein the selected comb spacing D is based at least partly on a frequency F that is an average of F1+F2, where F=(F1+F2)/2.

23. Apparatus according to claim 1, wherein the acoustic comb filter module is configured to base the excitation on the two different frequencies F1 and F2, so the swept acoustic standing wave is a quasi-standing wave that is swept back and forth in an oscillatory manner across the flow stream.

24. A method for filtering a flow stream flowing in a flow pipe in a flow direction, comprising:

arranging opposing acoustic transducers on the flow pipe having a first ultrasonic transmitter and a second ultrasonic transmitter;

responding with the first ultrasonic transmitter to control signaling and providing a first acoustic signal at a first frequency F1;

responding with the second ultrasonic transmitter to the control signaling and providing a second acoustic signal at a second frequency F2, the first frequency F1 and the second frequency F2 being two different frequencies F1 and F2; and receiving in an acoustic comb filter module having a controller signaling containing information about the first frequency F1 and the second frequency F2, and providing the control signaling for controlling the operation of the first ultrasonic transmitter and the second ultrasonic transmitter to generate a swept acoustic standing wave that is transverse to the flow direction of the flow stream in the flow pipe and having a selected comb spacing D set up via excitation based at least partly on the two different frequencies F1 and F2 to capture and sweep lower certain particles having a selected size X in a flow stream flowing in a flow pipe, the sweep of the swept acoustic standing wave being based at least partly on a transit time across the flow stream being less than a capture time of the certain particles.

25. A method according to claim 24, wherein the method comprises providing via a detection port in the flow pipe the certain particles having the selected size X in the flow stream from the flow pipe for off-stream analysis.

26. A method according to claim 24, wherein the flow stream is a slurry flow.

27. A method according to claim 24, wherein the method comprises:

arranging the first ultrasonic transmitter on the flow pipe; and arranging the second ultrasonic transmitter on the flow pipe across from the first ultrasonic transmitter in order to generate the swept acoustic standing wave that is transverse to the flow direction of the flow stream in the flow pipe.

28. A method according to claim 24, wherein the method comprises:

arranging the first ultrasonic transmitter and the second ultrasonic transmitter on opposite sides of the flow pipe in order to generate the swept acoustic standing wave that is transverse to the flow direction of the flow stream in the flow pipe; and arranging the detection port on one of the opposite sides in order to receive the certain particles captured having the selected size X in the flow stream from the flow pipe for the off-stream analysis.

29. A method according to claim 28, wherein the method comprises:

arranging the detection port on one downstream from the first ultrasonic transmitter and the second ultrasonic transmitter.

* * * * *